April 11, 1950     F. S. RADER     2,503,509
OSCILLATING SIGNAL REFLECTOR FOR VEHICLES
Filed Dec. 10, 1947
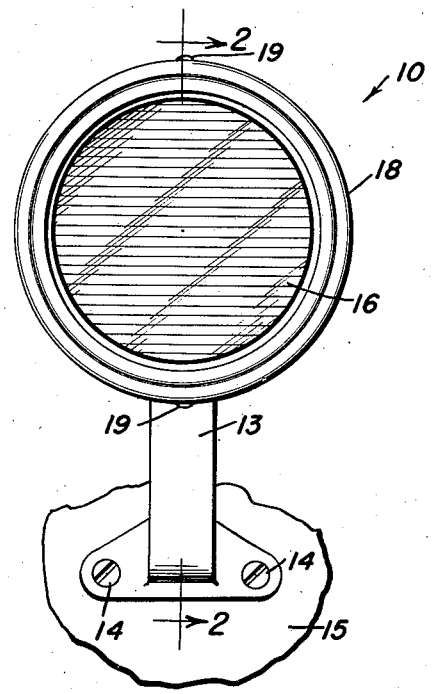
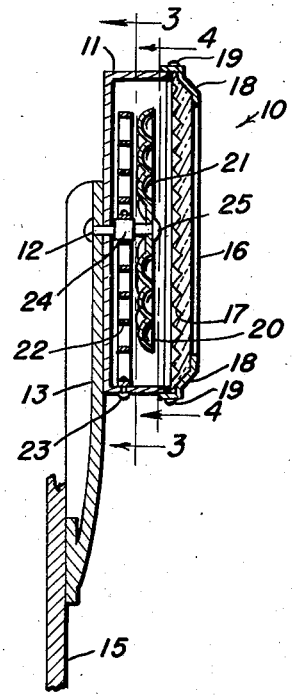
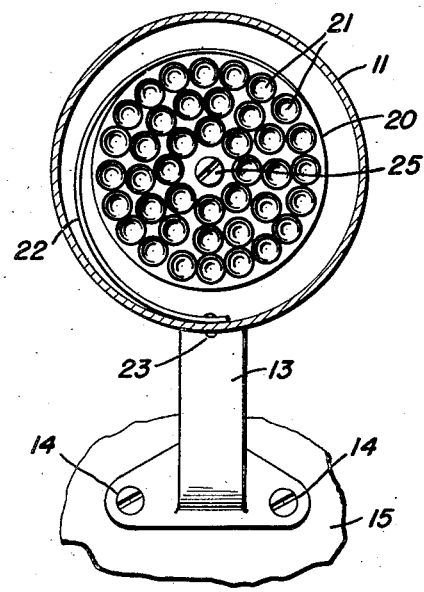
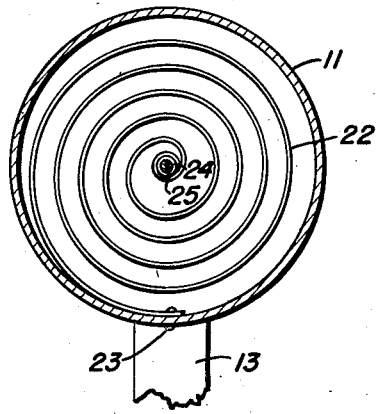
Frederick S. Rader
INVENTOR.
BY *Clarence A. O'Brien*
*and Harvey B. Jacobson*
ATTORNEYS.

Patented Apr. 11, 1950

2,503,509

UNITED STATES PATENT OFFICE 2,503,509

OSCILLATING SIGNAL REFLECTOR FOR VEHICLES

Frederick S. Rader, Casper, Wyo.

Application December 10, 1947, Serial No. 790,743

1 Claim. (Cl. 88—81)

This invention relates to new and useful improvements and structural refinements in vehicle reflectors, and the principal object of the invention is to provide a device of the character herein described, such as may be conveniently and effectively employed on the rear of automobiles, trucks, and similar vehicles, for the purpose of reflecting warning light rays emanating from other vehicles following that on which the invention is mounted.

A further object of the invention is to provide a vehicle reflector which moves concurrently with the jarring or swinging movement of the vehicle on which it is used, so that it may be more easily noticed by potential observers.

Another object of the invention is to provide a vehicle reflector which is simple in construction, which will not easily become damaged, and which will readily lend itself to economical manufacture.

A still further object of the invention is to provide a vehicle reflector which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is an elevational view of the invention;

Figure 2 is a cross sectional view, taken substantially in the plane of the line 2—2 in Figure 1;

Figure 3 is a cross sectional view, taken substantially in the plane of the line 3—3 in Figure 2, and;

Figure 4 is a cross sectional view, taken substantially in the plane of the line 4—4 in Figure 2.

Like characters of reference are employed to designate like parts in the specification and throughout the several views.

Referring now to the accompanying drawings in detail, the invention consists of a vehicle reflector designated generally by the reference character 10, the same embodying in its construction a suitable disc-shaped housing 11 secured by means of a bolt or rivet 12 to a bracket 13, which, in turn, is rigidly attached by means of bolts or screws 14 to a suitable supporting structure, such as for example, the body 15 of a vehicle on which the reflector is to be used.

The housing 11 is provided with an opening which, in turn, is covered by a lens 16, the latter being of more or less conventional type and being provided on the inner surface thereof with a plurality of depressions 17, as will be clearly apparent. The lens 16 is retained in position by means of a rim 18, the latter being removably attached to the open end of the housing 11, as at 19.

The essence of novelty in the invention resides in the provision of a disc-like reflector plate 20, the latter being formed with a plurality of concavities 21 disposed adjacent the lens 16, as is best shown in Figure 2. The plate 20 is movably supported by means of a spiral spring 22, the outer end of the latter being rigidly secured to the housing 11 as at 23, while the inner end of the spring is rigidly secured to the plate 20 by means of a boss 24 carrying a rivet 25.

It should, of course, be appreciated that no rigid connection exists between the rivets 12, 25 so that when the invention is placed in use, the plate 21, by virtue of its mounting on the spring 22, is free to vibrate in accordance with the jarring or swaying movement of the vehicle to which the reflector is attached.

If desired, an incandescent lamp (not shown) may be provided within the housing 11, so as to facilitate the use of the reflector as a tail light.

It is believed that the advantages and use of the invention will be clearly understood from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a vehicle reflector, the combination of a disc-shaped housing including a perimetric wall and a vertical end wall, a flat spiral spring having an outer end secured to the inner surface of said wall at the bottom of the housing, a boss provided at the inner end of said spring substantially at the center of the housing, and a disc-shaped reflector spaced from said spring and secured at the center thereof to said boss whereby it may oscillate and reciprocate horizontally and vertically in a plane parallel to said end wall.

FREDERICK S. RADER.

REFERENCES CITED

The following references are of record in the file of this patent:

UNITED STATES PATENTS

| Number | Name | Date |
| --- | --- | --- |
| 2,034,603 | Bergstrom | Mar. 17, 1936 |
| 2,096,166 | Eshbaugh | Oct. 19, 1937 |
| 2,096,275 | Doyle | Oct. 19, 1937 |
| 2,124,793 | Persons | July 26, 1938 |
| 2,226,159 | Hoffmann | Dec. 24, 1940 |

FOREIGN PATENTS

| Number | Country | Date |
| --- | --- | --- |
| 548,234 | France | Oct. 16, 1922 |
| 2,792 | Australia | June 27, 1931 |
| 527,593 | Great Britain | Oct. 11, 1940 |